(12) United States Patent
Linkola

(10) Patent No.: US 12,022,321 B1
(45) Date of Patent: *Jun. 25, 2024

(54) DYNAMIC COMMUNICATION CHANNEL SWITCHING IN A WIRELESS ACCESS POINT

(71) Applicant: CSC Holdings, LLC, Bethpage, NY (US)

(72) Inventor: Janne Linkola, Brooklyn, NY (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,020

(22) Filed: Mar. 30, 2023

Related U.S. Application Data

(63) Continuation of application No. 17/208,575, filed on Mar. 22, 2021, now Pat. No. 11,622,295, which is a continuation of application No. 16/734,943, filed on Jan. 6, 2020, now Pat. No. 10,959,127, which is a continuation of application No. 16/111,532, filed on Aug. 24, 2018, now Pat. No. 10,536,877, which is a continuation of application No. 15/019,320, filed on Feb. 9, 2016, now Pat. No. 10,104,575.

(51) Int. Cl.
*H04W 28/02* (2009.01)
*H04W 28/12* (2009.01)

(52) U.S. Cl.
CPC ... *H04W 28/0289* (2013.01); *H04W 28/0263* (2013.01); *H04W 28/0284* (2013.01); *H04W 28/12* (2013.01)

(58) Field of Classification Search
CPC ......... H04W 28/0289; H04W 28/0284; H04W 28/12; H04W 28/0263
See application file for complete search history.

(56) References Cited

U.S. PATENT DOCUMENTS

| | | | |
|---|---|---|---|
| 8,116,761 B1 * | 2/2012 | Singh | H04W 68/02 455/445 |
| 10,140,575 B2 | 10/2018 | Linkola | |
| 10,536,877 B1 | 1/2020 | Linkola | |

(Continued)

*Primary Examiner* — Ajay Cattungal
(74) *Attorney, Agent, or Firm* — Sterne, Kessler, Goldstein & Fox P.L.L.C.

(57) ABSTRACT

A wireless access point (WAP) determines whether to switch from one or more first communication channels to one or more second communication channels when the one or more first communication channels are experiencing congestion. The WAP determines an amount of congestion the one or more first communication channels are experiencing. When the one or more first communication channels are experiencing congestion, the WAP determines whether one or more communication devices can support, or reliably support, a channel switching announcement signal using the one or more first communication channels. If a sufficient number of communication devices from among the one or more communication devices can support, or reliably support, the channel switching announcement signal, the WAP broadcasts the channel switching announcement signal to the one or more communication devices to announce its intention to switch from the one or more first communication channels to the one or more second communication channels.

20 Claims, 4 Drawing Sheets

(56) References Cited

U.S. PATENT DOCUMENTS

Figure 1A:
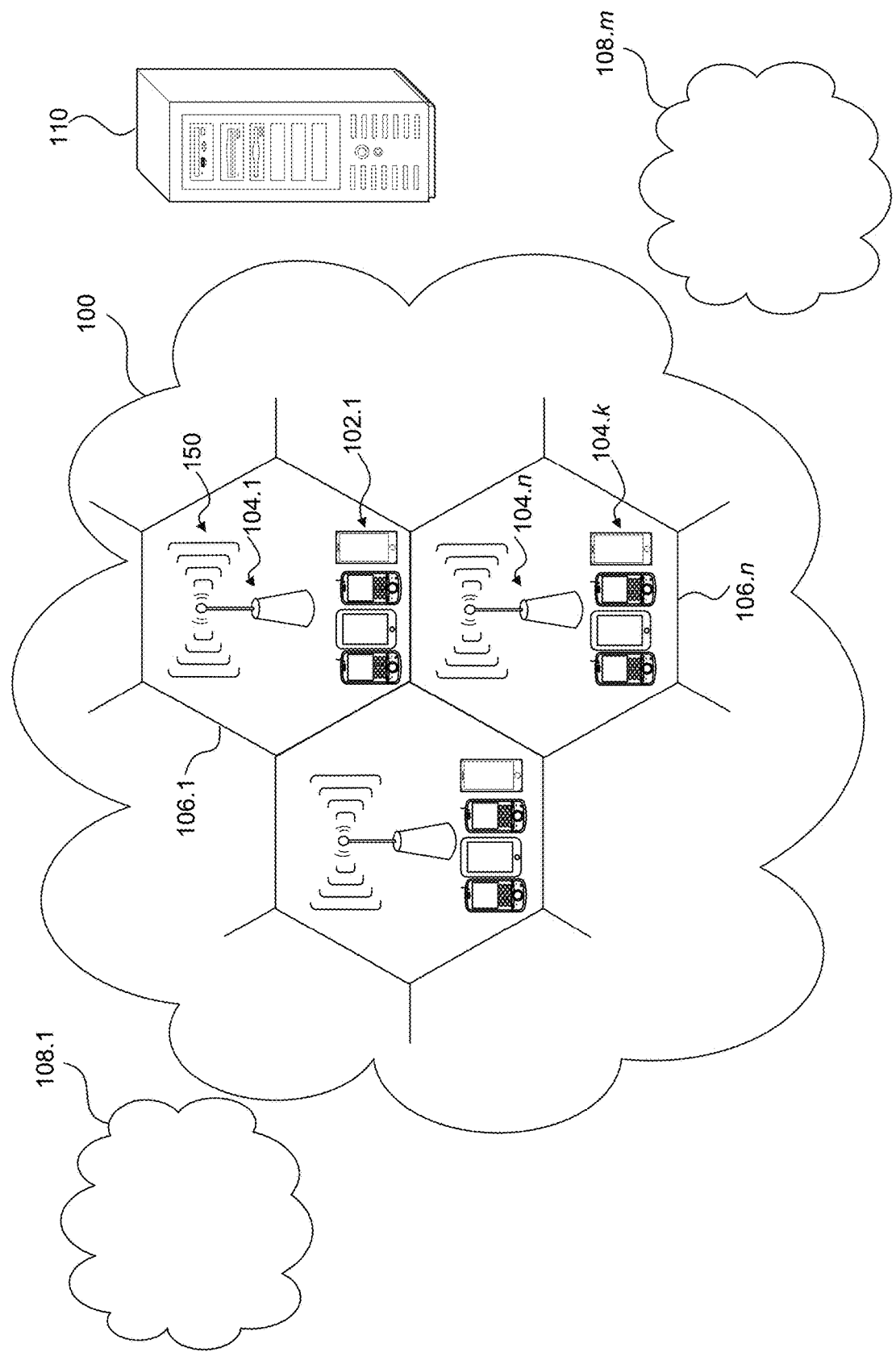

| | | | |
|---|---|---|---|
| 10,959,127 B1 | 3/2021 | Linkola | |
| 11,622,295 B1 | 4/2023 | Linkola | |
| 2005/0189181 A1* | 9/2005 | Meyle | B66B 11/0095 187/382 |
| 2009/0213742 A1* | 8/2009 | French | H04M 3/2281 370/252 |
| 2012/0115491 A1* | 5/2012 | Nicholson | H04M 3/4228 455/445 |
| 2013/0304905 A1* | 11/2013 | Appachiappan | H04L 41/5032 709/224 |
| 2015/0065157 A1* | 3/2015 | Homchaudhuri | H04W 84/005 455/452.1 |
| 2016/0283372 A1* | 9/2016 | Davis | G06F 16/1748 |
| 2017/0208121 A1* | 7/2017 | Granshaw | H04L 43/0876 |

* cited by examiner

DYNAMIC COMMUNICATION CHANNEL SWITCHING IN A WIRELESS ACCESS POINT

CROSS-REFERENCE TO RELATED APPLICATIONS

This application is a continuation of U.S. patent application Ser. No. 17/208,575, filed on Mar. 22, 2021, now U.S. Pat. No. 11,622,295, which is a continuation of U.S. patent application Ser. No. 16/734,943, filed on Jan. 6, 2020, now U.S. Pat. No. 10,959,127, which is a continuation of U.S. patent application Ser. No. 16/111,532, filed on Aug. 24, 2018, now U.S. Pat. No. 10,536,877, which is a continuation of U.S. patent application Ser. No. 15/019,320, filed on Feb. 9, 2016, now U.S. Pat. No. 10,104,575, each of which is incorporated by reference in its entirety.

BACKGROUND

Field of Disclosure

The present disclosure generally relates to a wireless network (WN) and including dynamic communication channel switching within the WN.

Related Art

The continued evolution of communication devices, such as mobile communication devices or personal computing devices, has allowed these devices to communicate vast amounts of information. Traditionally, these communication devices were directly connected to each other using communication cables to support wired communication. This traditional wired communication is now being replaced by wireless communication through a conventional wireless network. The conventional wireless network represents a wireless communication network distributed over various geographical coverage areas, each geographical coverage area being served by one or more access point (APs). The conventional wireless network allows the mobile communication devices to communicate vast amounts of information without being bound to the communication cables allowing the mobile communication devices to freely move about the conventional wireless network. Unfortunately, the resources, such as spectrum bandwidth to provide an example, available to the conventional wireless network to communicate these vast amounts of information are limited. As more APs and more mobile communication devices become part of the conventional wireless network, the APs and the mobile communication devices can begin to interfere with each other causing congestion of the WN. This interference is especially prevalent when the APs and the mobile communication devices use the same resources, such as the same spectrum bandwidth to provide an example. Not only can this interference reduce the ability of the conventional wireless network to communication information, it can also degrade the experiences of users of the conventional wireless network.

BRIEF DESCRIPTION OF THE DRAWINGS/FIGURES

Figure 1B:
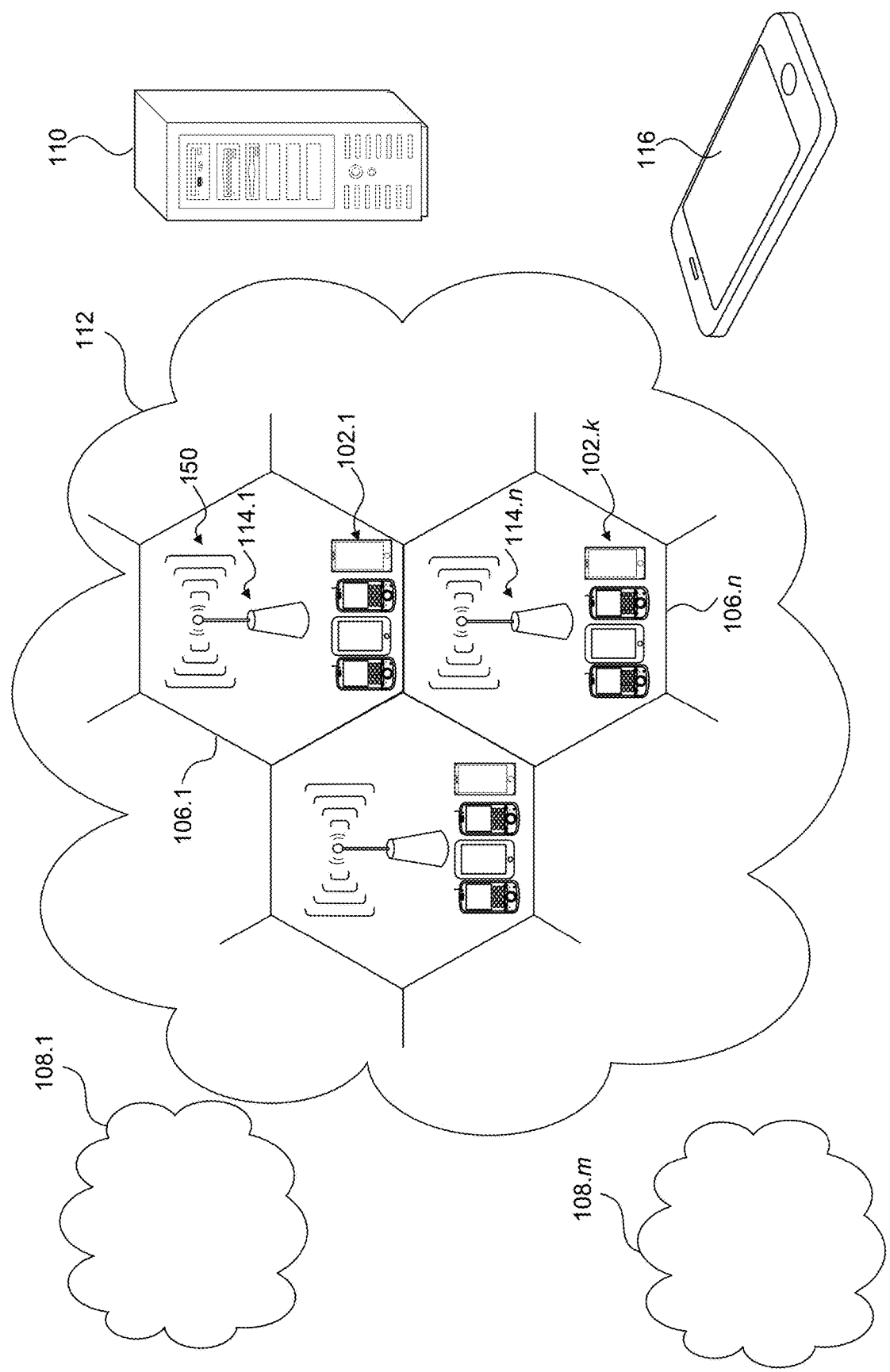
Figure 2:
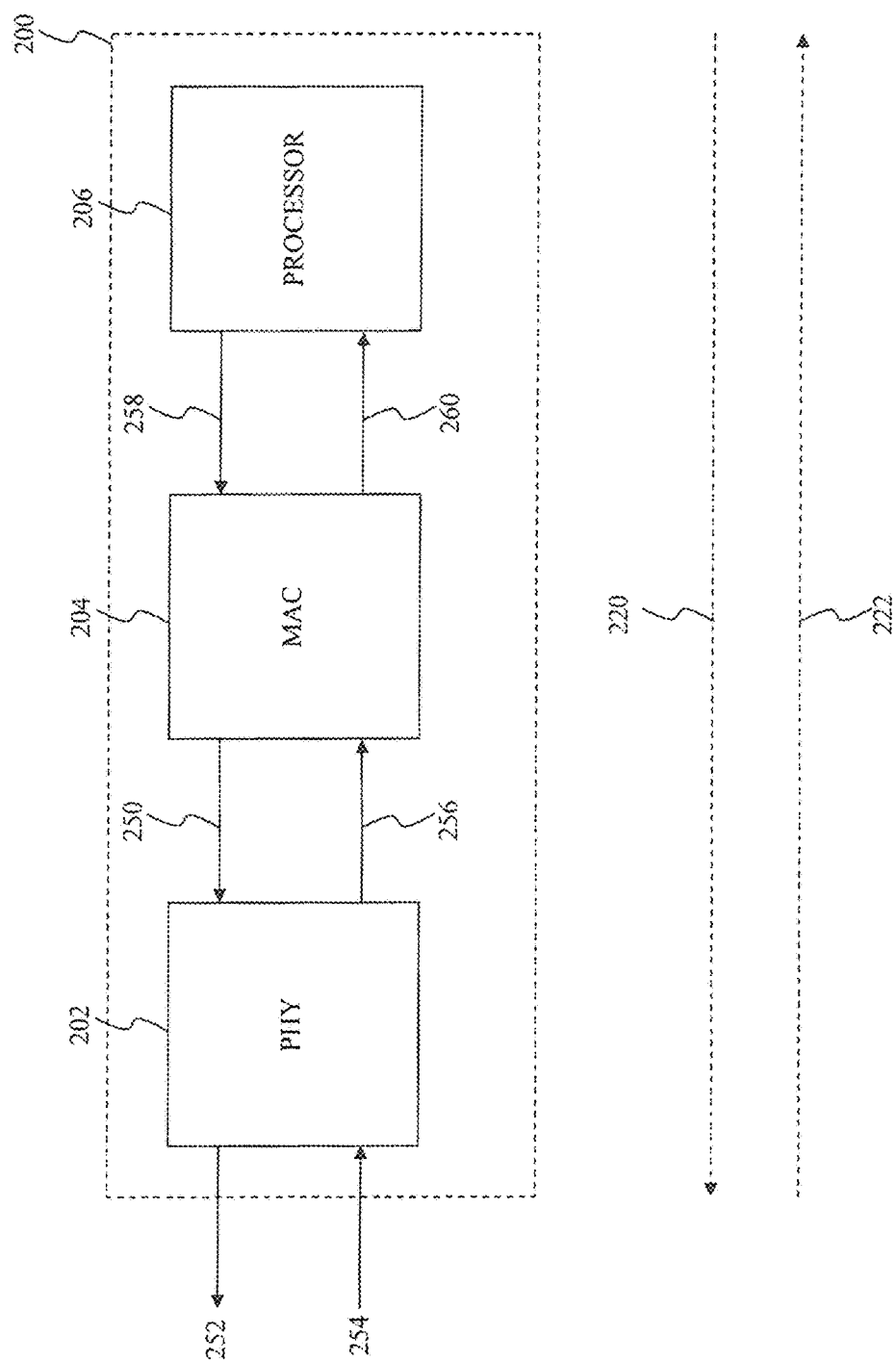
Figure 3:
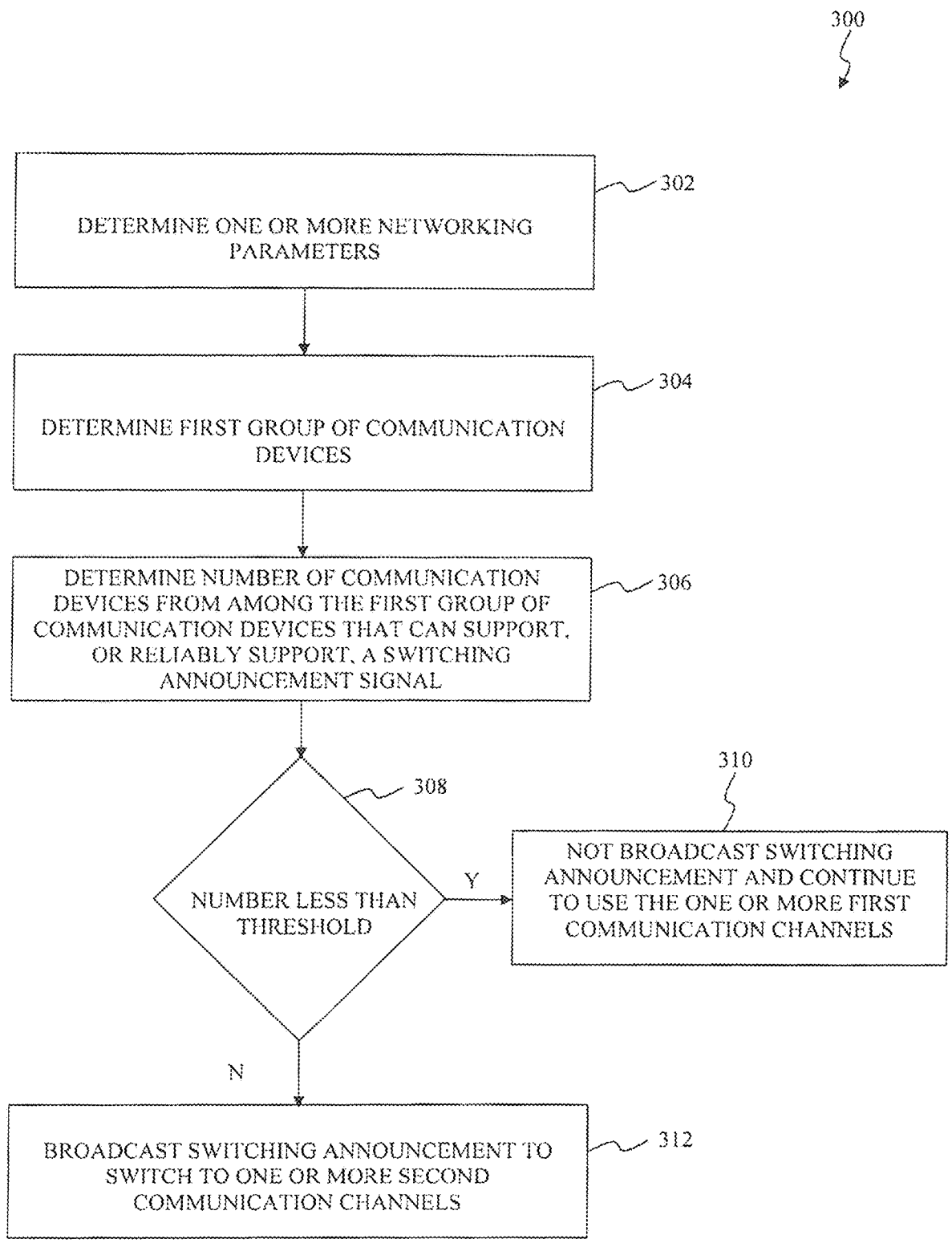

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings:

FIG. 1A graphically illustrates a first wireless network according to an exemplary embodiment of the present disclosure;

FIG. 1B graphically illustrates a second wireless network according to an exemplary embodiment of the present disclosure;

FIG. 2 graphically illustrates block diagram of a wireless access point (WAP) that can be implemented within the wireless network (WN) according to an exemplary embodiment of the present disclosure; and FIG. 3 is a flowchart of exemplary operational steps of the processor to determine whether to switch from one or more first communication channels to one or more second communication channels according to an exemplary embodiment of the present disclosure.

The present disclosure will now be described with reference to the accompanying drawings.

DETAILED DESCRIPTION OF THE DISCLOSURE

Overview

A wireless access point (WAP) determines whether to switch from one or more first communication channels to one or more second communication channels when the one or more first communication channels are experiencing congestion. The WAP determines an amount of congestion the one or more first communication channels are experiencing. When the one or more first communication channels are experiencing congestion, the WAP determines whether one or more communication devices can support, or reliably support, a channel switching announcement signal using the one or more first communication channels. If a sufficient number of communication devices from among the one or more communication devices can support, or reliably support, the channel switching announcement signal, the WAP broadcasts the channel switching announcement signal to the one or more communication devices to announce its intention to switch from the one or more first communication channels to the one or more second communication channels.

Exemplary Adaptive Wireless Networks

FIG. 1A graphically illustrates a first wireless network according to an exemplary embodiment of the present disclosure. A wireless network (WN) 100 provides wireless communication between one or more communication devices 102.1 through 102.$k$ and wireless access points (WAPs) 104.1 through 104.$n$ within geographical coverage areas 106.1 through 106.$n$. Additionally, the WN 100 is proximate to one or more other WNs 108.1 through 108.$m$. The one or more other WNs 108.1 through 108.$m$ similarly include one or more WAPs communicatively coupled to one or more communication devices. In an exemplary embodiment, the one or more coverage areas of the other WNs 108.1 through 108.$m$ can overlap with one or more of the geographical coverage areas 106.1 through 106.$n$.

The one or more communication devices 102.1 through 102.$k$ can represent one or more mobile telephony devices, such as one or more mobile phones, one or more mobile computing devices, one or more mobile internet devices, such as one or more tablet computers and/or one or more laptop computers, one or more personal digital assistants, one or more handheld game consoles, one or more portable media players, one or more digital cameras, one or more pagers, one or more personal navigation devices, and/or any other suitable communication device that is capable of wireless communication within the WN 100. The geographical coverage areas 106.1 through 106.*n* can represent relatively small areas, such as within a person's reach, to form one or more wireless personal area networks (WPANs), short distances within structures, such as homes, schools, computer laboratory, or office buildings, to form one or more wireless local area networks (WLANs), one or more large areas, such as between neighboring towns and cities or a city and suburb, to form one or more wireless wide area network (WWANs), and/or any combination of WPANs, WLANs, and/or WWANs that will be apparent to those skilled in the relevant art(s) without departing from the spirit and scope of the present disclosure. Although not illustrated in FIG. 1A, one or more of the geographical coverage areas 106.1 through 106.*n* may overlap with each other.

The WAPs 104.1 through 104.*n* operate in a substantially similar manner to each other; therefore; only the WAP 104.1 is described in further detail. The WAP 104.1 communicates with the one or more communication devices 102.1 within the geographical coverage area 106.1 and, in some situations, with the one or more communication devices 102.2 through 102.*k* within the geographical coverage areas 106.2 through 106.*n* in accordance with one or more communication standards or protocols. The one or more communication standards or protocols can include various wireless networking communication standards or protocols, such as a version of an Institute of Electrical and Electronics Engineers (I.E.E.E.) 802.11 communication standard, for example, 802.11a, 802.11b/g/n, 802.11h, and/or 802.11ac which are collectively referred to as Wi-Fi, an I.E.E.E. 802.16 communication standard, also referred to as WiMax, a version of a Bluetooth communication standard, a version of a ZigBee communication standard, a version of a Z-Wave communication standard, a version of a IPv6 over Low power Wireless Personal Area Networks (6LoWPAN) communication standard, a version of Insteon, an ISO/IEC 14543-3-10 communication standard, also referred to as EnOcean, and/or or any other wireless communication standard or protocol that will be apparent to those skilled in the relevant art(s) without departing from the spirit and scope of the present disclosure. The one or more communication standards or protocols often physically and/or logically partition the spectrum available to the WAP 104.1 into multiple communication channels.

As illustrated in FIG. 1A, a network server 110 allocates one or more of the multiple communication channels to the WAP 104.1 for communicating with the one or more communication devices 102.1 within the geographical coverage area 106.1 and, in some situations, with the one or more communication devices 102.2 through 102.*k* within the geographical coverage areas 106.2 through 106.*n*. This allocation can be performed in accordance with a Fixed Channel Allocation or Fixed Channel Assignment (FCA), a Dynamic Frequency Selection (DFS), or a Dynamic Channel Allocation or Dynamic Channel Assignment (DCA) to provide some examples. The network server 110 can be situated within one or more of the geographical coverage areas 106.1 through 106.*n* or outside of the geographical coverage areas 106.1 through 106.*n* and communicates with the WAPs 104.1 through 104.*n* using any suitable wired communication and/or wireless communication that will be apparent to those skilled in the relevant art(s) without departing from the spirit and scope of the present disclosure. The network server 110 can represent multiple servers distributed within a single geographic location, such as a premises of a service provider, or the multiple servers can be distributed among multiple geographic locations.

The WAP 104.1 communicates with a first group of communication devices from among the one or more communication devices 102.1 using one or more first communication channels from among the one or more allocated communication channels. The first group of communication devices represents one or more communication devices from among the one or more communication devices 102.1 that communicate with the WAP 104.1 using the one or more first communication channels. However, those skilled in the relevant art(s) will recognize that the WAP 104.1 can communicate with other groups of communication devices from among the one or more communication devices 102.1, such as a second group of communication devices from among the one or more communication devices 102.1, using one or more other communication channels from among the one or more allocated communication channels without departing from the spirit and scope of the present disclosure. Often times, the one or more first communication channels are shared among the WAPs 104.1 through 104.*n* and/or WAPs of the other WNs 108.1 through 108.*m*. As a result of this sharing, the one or more first communication channels can become congested. The WAP 104.1 determines whether to switch from the one or more first communication channels to one or more second communication channels from among the one or more allocated communication channels when the one or more first communication channels are experiencing congestion to avoid this congestion.

The WAP 104.1 determines one or more networking parameters of the one or more first communication channels and determines whether to switch to the one or more second communication channels based upon one or more comparisons of the one or more networking parameter to one or more networking thresholds. The one or more networking parameters can include a quality, such as a Quality of Service (QoS) to provide an example, of the one or more first communication channels, a cost, such as a monetary cost to provide an example, of the one or more first communication channels, or a congestion of the one or more first communication channels, power levels of signals of one or more communication devices 102.1 that communicate with the WAP 104.1 using the one or more first communication channels, various parameters, such as receiver sensitivity, of one or more communication devices 102.1 that communicate with the WAP 104.1 using the one or more first communication channels, and/or any other measureable parameter that will be apparent to those skilled in the relevant art(s) without departing from the spirit and scope of the present disclosure to provide some examples. For example, the WAP 104.1 determines an amount of congestion the one or more first communication channels are experiencing to determine whether to switch to the one or more second communication channels. Typically, the wireless networking traffic within the WN 100 and/or the wireless networking traffic within the one or more other WNs 108.1 through 108.*m* can occupy the one or more first communication channels. As a result, the wireless networking traffic within the one or more other WNs 108.1 through 108.*m* as well as the wireless networking traffic within the WN 100 can cause the one or more first communication channels to experience congestion. The WAP 104.1 determines the amount of congestion through monitoring the wireless networking traffic and/or a carrier sense function. In an exemplary embodiment, the WAP 104.1 determines the amount of congestion in terms of airtime capacity utilization or airtime channel utilization. In this exemplary embodiment, the WAP 104.1 measures the airtime capacity utilization of the one or more first communication channels at different instances in time, for example, at five (5) minute intervals. In this exemplary embodiment, the WAP 104.1 averages multiple measurements of the airtime capacity utilization and compares this average to a congestion threshold to determine whether the one or more first communication channels are experiencing congestion. The congestion threshold, in this exemplary embodiment, assumes different values dependent upon a time of day, e.g., morning, evening, or night.

Once the WAP 104.1 determines to switch to the one or more second communication channels, the WAP 104.1 thereafter determines whether the first group of communication devices can support, or reliably support, a channel switching announcement signal 150. Herein, the first group of communication devices support the channel switching announcement signal 150 when the first group of communication devices has the capability to switch, in response to the channel switching announcement signal 150, to the one or more second communication channels. However, in some situations, the first group of communication devices may not actually switch to the one or more second communication channels in response to the channel switching announcement signal 150 even though the first group of communication devices support the channel switching announcement signal 150. The first group of communication devices reliably support the channel switching announcement signal 150 when the first group of communication devices has the capability to switch and actually switch to the one or more second communication channels. For example, when the one or more first communication channels are experiencing congestion, the WAP 104 determines whether the first group of communication devices can support, or reliably support, a channel switching announcement signal 150. To make this determination, the WAP 104.1 broadcasts the channel switching announcement signal 150 to notify the first group of communication devices of its intent to switch to the one or more second communication channels. The channel switching announcement signal 150 can represent a Channel Switching Announcement (CSA) as prescribed in the I.E.E.E. 802.11h communication standard or protocol or an Extended Channel Switch Announcement (ECSA) as prescribed in the I.E.E.E. 802.11y communication standard or protocol to provide some examples, each of these communication standards or protocols are hereby incorporated by reference in their entirety. In an exemplary embodiment, the channel switching announcement signal 150 is broadcast as part of a management frame such as a Beacon frame, a Probe Response frame, and/or a Channel Switch Announcement frame to provide some examples.

In an exemplary embodiment, the WAP 104.1 locally determines which communication devices from among the first group of communication devices can support, or reliably support, the channel switching announcement signal 150. To determine which communication devices from among the first group of communication devices can support, or reliably support, the channel switching announcement signal 150, the WAP 104.1 assumes the first group of communication devices supports, or reliably supports, the channel switching announcement signal 150. Thereafter, the WAP 104.1 broadcasts the channel switching announcement signal 150 to the first group of communication devices. Next, the WAP 104.1 determines a duration in time needed for each of the first group of communication devices to switch from the one or more first communication channels to the one or more second communication channels after broadcasting the channel switching announcement signal 150. In this exemplary embodiment, the duration in time needed by a corresponding communication device from among the first group of communication devices represents time between the broadcasting of the channel switching announcement signal 150 over the one or more first communication channels and receiving a response to the channel switching announcement signal 150 from the corresponding communication device over the one or more second communication channels. The response to the channel switching announcement signal 150 represents an indication that the corresponding communication device has switched from the one or more first communication channels to the one or more second communication channels. Thereafter, the WAP 104.1 compares each duration in time for each of the first group of communication devices with a switching threshold. When a duration in time of a corresponding communication device from among the first group of communication devices is less than or equal to the switching threshold, the corresponding communication device is considered to support the channel switching announcement signal 150. Otherwise, a duration in time of a corresponding communication device from among the first group of communication devices is greater than the switching threshold, the corresponding communication device is considered not to support the channel switching announcement signal 150. In this exemplary embodiment, the WAP 104.1 monitors the instances in time needed for each of the first group of communication devices over multiple switches of the one or more allocated communication channels to determine whether each of the first group of communication devices reliably supports the channel switching announcement signal 150. After a predetermined number of broadcastings of the channel switching announcement signal 150, the WAP 104.1 has acquired sufficient information regarding the switching capabilities of the first group of communication devices to allow the WAP 104.1 to determine whether each of the first group of communication devices can reliably support the channel switching announcement signal 150.

In another exemplary embodiment, the determination which communication devices from among the first group of communication devices can support, or reliably support, the channel switching announcement signal is performed remotely by the network server 110. The WAP 104.1 queries the network server 110 to determine whether each of the first group of communication devices can support, or reliably support, the channel switching announcement signal 150. In this other exemplary embodiment, the network server 110 stores one or more switching databases having one or more entries for one or more of the first group of communication devices indicating whether these communication devices can support, or reliably support, the channel switching announcement signal 150. In response to the query from the WAP 104.1, the network server 110 provides a response to the WAP 104.1 having information indicating whether the one or more of the first group of communication devices support, or reliably support, the channel switching announcement signal 150. In some situations, the response additionally indicates one or more of the first group of communication devices do not have entries in the one or more switching databases. In these situations, the WAP 104.1 determines whether the one or more of the first group of communication devices without entries in the one or more switching databases support, or reliably support, the channel switching announcement signal 150 as discussed above.

Thereafter, the WAP 104.1 forwards this determination onto the network server 110 to update the one or more switching databases.

If a sufficient number of the first group of communication devices can support, or reliably support, the channel switching announcement signal, the WAP 104.1 broadcasts the channel switching announcement signal 150 to the first group of communication devices to announce its intention to switch from the one or more first communication channels to the one or more second communication channels. In a further exemplary embodiment, once the WAP 104.1 has determined whether the first group of communication devices supports, or reliably supports, the channel switching announcement signal 150, the WAP 104.1 uses this information to determine whether to switch to the one or more second communication channels when the one or more first communication channels are experiencing congestion. The WAP 104.1 compares a number of the first group of communication devices that cannot support, or reliably support, the channel switching announcement signal 150 to one or more supporting thresholds. In this further exemplary embodiment, the WAP 104.1 switches from the one or more first communication channels to the one or more second communication channels by broadcasting the channel switching announcement signal 150 when this number is less than the one or more supporting thresholds. Otherwise, the WAP 104.1 continues to use the one or more first communication channels when this number is greater than the one or more supporting thresholds even if the one or more first communication channels are experiencing congestion.

In a yet further exemplary embodiment, the one or more supporting thresholds are defined based upon a level of activity of the first group of communication devices. In this exemplary embodiment, the first group of communication devices is considered as inactive communication devices, normally active communication devices, or super active communication devices. Typically, super active communication devices represent communication devices from among the first group of communication devices that have one or more active voice, video, gaming, and/or other high volume data communications, normally active communication devices represent communication devices from among the first group of communication devices that have one or more active data communications, and inactive communication devices communication devices represent communication devices from among the first group of communication devices that are presently not communicating. In this yet further exemplary embodiment, the one or more supporting thresholds include a super active supporting threshold and a normally active supporting threshold. The number of super active communication devices from among the first group of communication devices is compared with the super active supporting threshold and the number of normal active communication devices from among the first group of communication devices is compared with the normally active supporting threshold. When the number of super active communication devices that support, or reliably support, the channel switching announcement signal 150 is greater than the super active supporting threshold and/or the number of normally active communication devices that support, or reliably support, the channel switching announcement signal 150 is greater than the normally active supporting threshold, the WAP 104.1 broadcasts the channel switching announcement signal 150 to switch from the one or more first communication channels to the one or more second communication channels.

FIG. 1B graphically illustrates a second wireless network according to an exemplary embodiment of the present disclosure. A wireless network (WN) 112 provides wireless communication between the one or more communication devices 102.1 through 102.k and wireless access points (WAPs) 114.1 through 114.n within the geographical coverage areas 106.1 through 106.n. Additionally, the WN 112 is proximate to the one or more other WNs 108.1 through 108.m. The WAPs 114.1 through 114.n operate in a substantially similar manner to each other; therefore; only the WAP 114.1 is described in further detail. Additionally, the WAP 104.1 and the WAP 114.1 share many substantially similar features; therefore, only differences between the WAP 104.1 and the WAP 114 are to be discussed in detail below.

In a similar manner as discussed in FIG. 1A, the network server 110 allocates the one or more of the multiple communication channels to the WAP 114.1 for communicating with the one or more communication devices 102.1 within the geographical coverage area 106.1 and, in some situations, with the one or more communication devices 102.2 through 102.k within the geographical coverage areas 106.2 through 106.n. The WAP 114.1 communicates with the first group of communication devices from among the one or more communication devices 102.1 using the one or more first communication channels from among the one or more allocated communication channels.

A monitoring device 116 determines the one or more networking parameters of the one or more first communication channels as discussed in FIG. 1A and determines whether to switch to the one or more second communication channels based upon one or more comparisons of the one or more networking parameter to one or more networking thresholds. In some situations, the monitoring device 114 can communicate the one or more networking parameters to the network server 110 and/or the WAP 114.1. In an exemplary embodiment, the monitoring device 116 represents a communication device that is within, or proximate to, the geographical coverage area 106.1 and the network server 110 and/or is remote from the geographical coverage area 106.1, typically, at a premises of a service provider to provide an example.

Thereafter, the network server 110 and/or the WAP 114.1 determines whether the first group of communication devices can support, or reliably support, the channel switching announcement signal 150 once the network server 110 and/or the WAP 114.1 determines, based on the comparison of the networking parameter to a networking threshold, to switch to the one or more second communication channels as discussed in FIG. 1A. Alternatively, or in addition to, these determinations can be performed by the monitoring device 116. If a sufficient number of the first group of communication devices can support, or reliably support, the channel switching announcement signal, the WAP 114.1 broadcasts the channel switching announcement signal 150 to the first group of communication devices to announce its intention to switch from the one or more first communication channels to the one or more second communication channels in a similar manner as the WAP 104.1 as discussed in FIG. 1A.

Exemplary Wireless Access Point (WAP) that can be Implemented within the Wireless Network (WN)

FIG. 2 graphically illustrates block diagram of a wireless access point (WAP) that can be implemented within the wireless network (WN) according to an exemplary embodiment of the present disclosure. A wireless access point (WAP) 200 determines whether to switch from one or more first communication channels to one or more second communication channels based upon whether one or more communication devices, such as the first group of communication devices as discussed in FIG. 1A and FIG. 1B to provide an example, support, or reliably support, a switching announcement signal, such as the channel switching announcement signal 150 to provide an example, when the or more first communication channels are experiencing congestion. The WAP 200 includes a processor 206, a media access controller (MAC) 204, and a physical layer device (PHY) 206. The WAP 200 can represent an exemplary embodiment of one or more of the WAP 104.1 through 104.n. The discussion of the WAP 200 to follow discusses the switching from the one or more first communication channels to the one or more second communication channels. Those skilled in the relevant art(s) will recognize that the WAP 200 can perform one or more other functions, such as communicating the wireless networking traffic to provide an example that will be apparent to those skilled in the relevant art(s) without departing from the spirit and scope of the present disclosure. In some situations, these one or more other functions can be prescribed by the one or more communication standards or protocols as discussed in FIG. 1A and FIG. 1B.

The PHY 202 represents an interface between the WAP 200 and the one or more communication devices and/or other WAPs within the WN. The PHY 202 defines electrical and physical specifications for the WAP 200, such as a relationship between the WAP 200 and a transmission medium to provide an example. Generally, the PHY 202 modulates, encodes, and/or converts an information frame 250 to provide an information signal 252 for transmission to the WN and/or to the network server over the transmission medium in the downlink direction 220. The PHY 202 establishes and/or terminates one or more connections to the transmission medium to transmit the information signal 252 in the downlink direction 220. The information frame 250 and/or the information signal 252 can include a query to a network server, such as the network server 110 to provide an example, to determine whether each of the one or more communication devices can support, or reliably support, the channel switching announcement signal, and/or information to the network server relating to which communication device from among the one or more communication devices can support, or reliably support, the channel switching announcement signal to provide some examples. Additionally, the PHY 202 demodulates, decodes, and/or converts an information signal 254 received over the transmission medium to provide an information frame 256 in the uplink direction 222. The PHY 202 establishes and/or terminates one or more connections to the transmission medium to receive the information signal 254 in the uplink direction 222. The information signal 254 and/or the information frame 256 can include a response to the query of the network server and/or a response to the channel switching announcement signal from one or more of the one or more communication devices to provide some examples.

The MAC 204 represents an interface between the PHY 202 and the processor 206. The MAC 204 manages and maintains communications of the WAP 200 by coordinating access to the transmission medium with the other WAPs and formats communications in accordance with one or more communication standards or protocols that are supported by the WAP 200. In the downlink direction 220, the MAC 204 encapsulates or frames a sequence of bits 258 to provide a payload portion of the information frame 250 and appends a preamble portion of the information frame 250 to the payload portion in accordance with the one or more communication standards or protocols, such as any of the communication standards or protocols as discussed above, to the provide the information frame 250. Otherwise, the MAC 204 decapsulates or de-frames the information frame 256 in accordance with the one or more communication standards or protocols to provide a payload portion of the information frame 256 as sequence of bits 260. The MAC 204 can, optionally, authenticate and/or authorize the information frame 256 before decapsulating or de-framing.

The processor 206 controls overall operation and/or configuration of the WAP 200. For example, the processor 206 determines one or more networking parameters of the one or more first communication channels and determines whether to switch to the one or more second communication channels based upon one or more comparisons of the one or more networking parameter to one or more networking thresholds as discussed in FIG. 1A. Thereafter, the processor 206 determines whether each of the one or more communication devices can support, or reliably support, the channel switching announcement signal. In an exemplary embodiment, the processor 206 assumes the one or more communication devices supports, or reliably supports, the channel switching announcement signal and determines whether each of the one or more communication devices can support, or reliably support, the channel switching announcement signal as discussed in FIG. 1A and FIG. 1B. In an exemplary embodiment, the processor 206 includes a first support counter and a second support counter corresponding to each of the one or more communication devices. Typically, each time the WAP 200 provides the channel switching announcement signal, the processor 206 starts an overall support counter. Each time the processor 206 receives the response to the channel switching announcement signal, the processor 206 compares the overall support counter to the switching threshold. When the overall support counter is greater than the switching threshold, the processor 206 increases the first support counter corresponding to a communication device from among the one or more communication devices that provides the response indicating that the communication device does not support the channel switching announcement signal. Otherwise, when the overall support counter is less than the switching threshold, the processor 206 increases the second support counter corresponding to a communication device from among the one or more communication devices that provides the response indicating that the communication device supports the channel switching announcement signal. In some situations, if the processor 206 does not receive the response after a predetermined amount of time, the processor 206 increases the first support counter corresponding to a communication device from among the one or more communication devices that does not provide the response indicating that the communication device does not support the channel switching announcement signal. After a predetermined number of broadcastings of the channel switching announcement signal, the processor 206 compares the second support counter to a reliability threshold to determine whether each of the one or more communication devices can reliably support the channel switching announcement signal.

In another exemplary embodiment, the determination of whether each of the one or more communication devices can support, or reliably support, the channel switching announcement signal can be made by a network server, such as the network server 110 to provide an example. In this other exemplary embodiment, the processor 206 sends a query to the network server as the sequence of bits 258 or provides a command to the MAC 204 to provide the query to the network server as the information frame 250 as discussed in FIG. 1A and FIG. 1B. In a further exemplary embodiment, the processor 206 can receive instructions or parameters from the network server which can be used to determine whether the one or more communication devices supports, or reliably supports, the channel switching announcement signal.

Once the processor 206 has determined whether the one or more communication devices supports, or reliably supports, the channel switching announcement signal, the processor 206 uses this information to determine whether to switch to the one or more second communication channels when the one or more first communication channels are experiencing congestion. The processor 206 compares the first support counter and/or the second support counter to the one or more supporting thresholds as discussed in FIG. 1A and FIG. 1B. The processor 206 switches from the one or more first communication channels to the one or more second communication channels by broadcasting the channel switching announcement signal when the first support counter and/or the second support counter is greater than and/or less than, respectively, the one or more supporting thresholds. Otherwise, the processor 206 continues to use the one or more first communication channels when the first support counter and/or the second support counter is less than and/or greater than, respectively, even if the one or more first communication channels are experiencing congestion.

Exemplary Operation of the Processor within the Wireless Access Point (WAP)

FIG. 3 is a flowchart of exemplary operational steps of the processor to determine whether to switch from one or more first communication channels to one or more second communication channels according to an exemplary embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 of a wireless access point (WAP) within a wireless network, such as one or more of the WAPs 104.1 through 104.n of the WN 100 or the WAP 200 to provide some examples.

At step 302, the operational control flow 300 determines one or more networking parameters of the one or more first communication channels and determines whether to switch to the one or more second communication channels based upon one or more comparisons of the one or more networking parameter to one or more networking thresholds as discussed in FIG. 1A and FIG. 1B. Typically, the operational control flow 300 is allocated multiple communication channels for communicating wireless networking traffic. The multiple communication channels can include the one or more first communication channels and one or more other communication channels, such as one or more second communication channels, for communicating the wireless networking traffic.

At step 304, the operational control flow 300 determines a first group of communication devices from among multiple communication devices, such as the one or more communication devices 102.1 to provide an example, using the one or more first communication channels to communicate their wireless networking traffic.

At step 306, the operational control flow 300 determines a number of communication devices from among the first group of communication devices that can support, or reliably support, a switching announcement signal, such as the channel switching announcement signal to provide an example. This determination of step 306 can be performed as discussed in FIG. 1A, FIG. 1B, and/or FIG. 2.

At step 308, the operational control flow 300 compares the number from step 306 to one or more supporting thresholds as discussed in FIG. 1A, FIG. 1B, and/or FIG. 2. The operational control flow 300 proceeds to step 310 when the number from step 306 is less than the one or more supporting thresholds. Otherwise, the operational control flow 300 proceeds to step 312 when the number from step 306 is not less than the one or more supporting thresholds.

At step 310, the operation control flow 300 does not broadcast the channel switching announcement signal to the first group of communication devices and continues to use the one or more first communication channels as discussed in in FIG. 1A, FIG. 1B, and/or FIG. 2.

At step 312, the operation control flow 300 broadcasts the channel switching announcement signal to the first group of communication devices to indicate its intention to switch from the one or more first communication channels to the one or more second communication channels as discussed in in FIG. 1A, FIG. 1B, and/or FIG. 2.

CONCLUSION

The following Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intend to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing device). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A wireless access point (WAP) within a wireless network, the WAP comprising:
    a physical layer (PHY) device configured to communicate to a first group of communication devices from among a plurality of communication devices using a first communication channel from among a plurality of communication channels; and
    a processor configured to:
        decide to switch from the first communication channel to a second communication channel from among the plurality of communication channels in response to detecting the first communication channel is experiencing congestion,
        query a network server to determine whether the first group of communication devices is capable of supporting a channel switching announcement signal that is to notify the first group of communication devices of its intent to switch from the first communication channel to the second communication channel,
        broadcast the channel switching announcement signal to the first group of communication devices using the first communication channel in response to receiving a response from the network server indicating that the first group of communication devices is capable of supporting the channel switching announcement signal, and
        switch from the first communication channel to the second communication channel in response to broadcasting the channel switching announcement signal.

2. The WAP of claim 1, wherein the processor is further configured to continue to use the first communication channel in response to detecting the first communication channel is not experiencing congestion.

3. The WAP of claim 1, wherein the processor is further configured to:
    measure utilization of the first communication channel at different instances in time;
    average the measured utilization of the first communication channel; and
    compare the averaged utilization of the first communication channel to a congestion threshold to detect whether the first communication channel is experiencing the congestion.

4. The WAP of claim 1, wherein the channel switching announcement signal comprises:
    a Channel Switching Announcement (CSA); or
    an Extended Channel Switch Announcement (ECSA), the CSA and the ECSA being prescribed in a version of an Institute of Electrical and Electronics Engineers (I.E.E.E.) 802.11 communication standard or protocol.

5. The WAP of claim 1, wherein the first group of communication devices comprises communication devices from among the plurality of communication devices that support, or reliably support, the channel switching announcement signal using the first communication channel.

6. The WAP of claim 1, wherein the response further indicates one or more second communication devices from among the first group of communication devices that do not have entries in a switching database, those communication devices from among the plurality of communication devices within the switching database being capable of switching from the first communication channel to the second communication channel.

7. The WAP of claim 6, wherein the processor is further configured to provide one or more determinations to the network server to indicate whether the one or more second communication devices are capable of switching from the first communication channel to the second communication channel to update the switching database.

8. A method for switching between a plurality of communication channels within a wireless network, the method comprising:
    communicating, by a wireless access point (WAP), to a first group of communication devices from among a plurality of communication devices using a first communication channel from among a plurality of communication channels;
    deciding, by the WAP, to switch from the first communication channel to a second communication channel from among the plurality of communication channels in response to a networking parameter of the first communication channel;
    querying, by the WAP, a network server to determine whether the first group of communication devices is capable of supporting a channel switching announcement signal that is to notify the first group of communication devices of its intent to switch from the first communication channel to the second communication channel;
    broadcasting, by the WAP, the channel switching announcement signal to the first group of communication devices using the first communication channel in response to receiving a response from the network server indicating that the first group of communication devices is capable of supporting the channel switching announcement signal; and
    switching, by the WAP, from the first communication channel to the second communication channel in response to broadcasting the channel switching announcement signal.

9. The method of claim 8, wherein the networking parameter of the first communication channel comprises a congestion of the first communication channel, and wherein the deciding comprises deciding to switch from the first communication channel to the second communication channel from among the plurality of communication channels in response to detecting the first communication channel is experiencing the congestion.

10. The method of claim 9, further comprising:

measuring utilization of the first communication channel at different instances in time;

averaging the measured utilization of the first communication channel; and comparing the averaged utilization of the first communication channel to a congestion threshold to detect whether the first communication channel is experiencing the congestion.

11. The method of claim 8, wherein the channel switching announcement signal comprises:

a Channel Switching Announcement (CSA); or an Extended Channel Switch Announcement (ECSA), the CSA and the ECSA being prescribed in a version of an Institute of Electrical and Electronics Engineers (I.E.E.E.) 802.11 communication standard or protocol.

12. The method of claim 8, wherein the first group of communication devices comprises communication devices from among the plurality of communication devices that support, or reliably support, the channel switching announcement signal using the first communication channel.

13. The method of claim 8, wherein the response further indicates one or more second communication devices from among the first group of communication devices that do not have entries in a switching database, those communication devices from among the plurality of communication devices within the switching database being capable of switching from the first communication channel to the second communication channel.

14. The method of claim 13, further comprising providing one or more determinations to the network server to indicate whether the one or more second communication devices are capable of switching from the first communication channel to the second communication channel to update the switching database.

15. A wireless access point (WAP) within a wireless network, the WAP comprising:

a memory configured to store instructions; and a processor configured to execute the instructions, the instructions, when executed by the processor, configuring the processor to:

decide to switch from a first communication channel from among a plurality of communication channels to a second communication channel from among the plurality of communication channels in response to a networking parameter of the first communication channel, query a network server to determine whether a first group of communication devices from among a plurality of communication devices is capable of supporting a channel switching announcement signal that is to notify the first group of communication devices of its intent to switch from the first communication channel to the second communication channel, broadcast the channel switching announcement signal to the first group of communication devices using the first communication channel in response to receiving a response from the network server indicating that the first group of communication devices is capable of supporting the channel switching announcement signal, and switch from the first communication channel to the second communication channel in response to broadcasting the channel switching announcement signal.

16. The WAP of claim 15, wherein the networking parameter of the first communication channel comprises a congestion of the first communication channel, and wherein the instructions, when executed by the processor, configure the processor to decide to switch from the first communication channel to the second communication channel from among the plurality of communication channels in response to detecting the first communication channel is experiencing the congestion.

17. The WAP of claim 15, wherein the channel switching announcement signal comprises:

a Channel Switching Announcement (CSA); or an Extended Channel Switch Announcement (ECSA), the CSA and the ECSA being prescribed in a version of an Institute of Electrical and Electronics Engineers (I.E.E.E.) 802.11 communication standard or protocol.

18. The WAP of claim 15, wherein the first group of communication devices comprises communication devices from among the plurality of communication devices that support, or reliably support, the channel switching announcement signal using the first communication channel.

19. The WAP of claim 15, wherein the response further indicates one or more second communication devices from among the first group of communication devices that do not have entries in a switching database, those communication devices from among the plurality of communication devices within the switching database being capable of switching from the first communication channel to the second communication channel.

20. The WAP of claim 19, wherein the instructions, when executed by the processor, further configure the processor to provide one or more determinations to the network server to indicate whether the one or more second communication devices are capable of switching from the first communication channel to the second communication channel to update the switching database.

* * * * *